I. V. Trump,
Harvester Cutter.

No. 21093 — Patented. Aug. 3, 1858

UNITED STATES PATENT OFFICE.

I. V. TRUMP, OF SOMERVILLE, NEW JERSEY.

IMPROVEMENT IN HARVESTERS.

Specification forming part of Letters Patent No. 21,093, dated August 3, 1858.

*To all whom it may concern:*

Be it known that I, I. V. TRUMP, of Somerville, in the county of Somerset and State of New Jersey, have invented a new and Improved Harvester; and I do hereby declare that the following is a full and exact description thereof, reference being had to the accompanying drawings, and to the letters of reference marked thereon.

In the employment of harvesters it is an advantage to the farmer to have the fingers or knife-guards so constructed as to be easily repaired. It is also important to bend the grass over as little as possible before cutting it, because such bending prevents cutting the grass closely, and produces an accumulation of grass before the knives, which is liable to choke them. Another desirable object is to prevent the fine grass from getting between the knives and guards or from fouling the cutter-bar, so as to interfere with its free movements.

My invention consists in the combination of peculiar knife-guards with a press-plate, finger-beam, and reciprocating cutters, for the purpose of making a more efficient, cheap, and convenient harvester.

Figure 1:
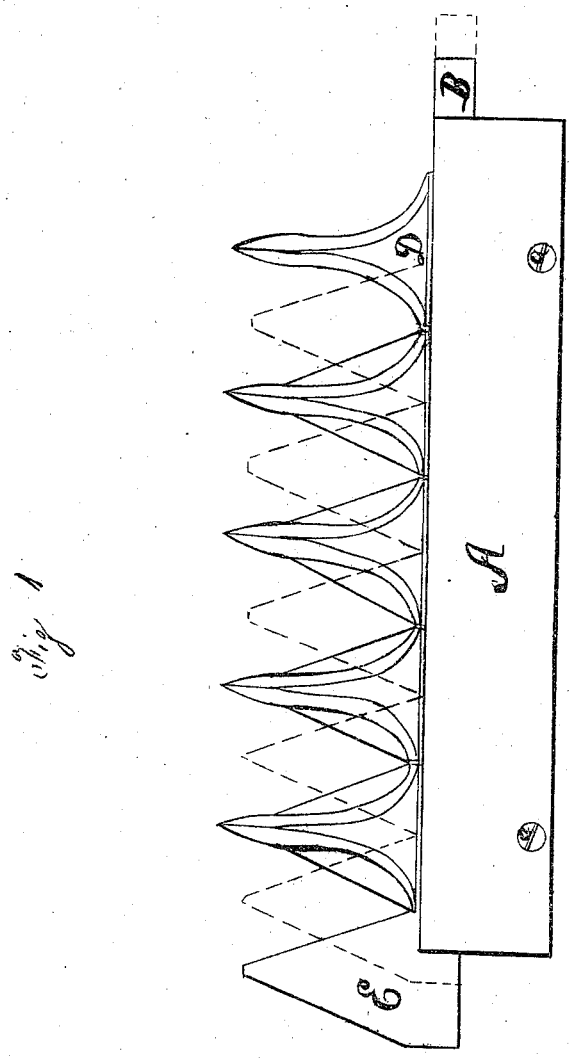
Figure 2:
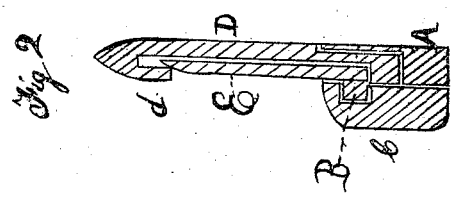

In the accompanying drawings, Figure 1 represents a top view of several of the knife-guards and knives with a portion of the press-plate which covers the knife-bar and finger-beam. Fig. 2 is a cross-section of the finger-beam and parts connected therewith, the section being made longitudinally through the center of one of the guards and of one of the knives.

The form of the finger-beam is seen in Fig. 2, at C, with a groove to receive the knife-bar B, which carries the reciprocating knives or cutters E. The beam C is covered by a press-plate, A, which is fastened by the screws *a* or by their equivalents. This press-plate holds the knife-bar B and the knife-guards D in place upon the beam C. Therefore it is very easy to separate the parts for inspection, cleaning, or repair.

The knife-guards D are made from plate-steel, being cut and then swaged into form. They have a very broad base, curved in front and finished with a tool-edge. They require no rivets, being held in place by the press-plate A. It should be observed that any one of these guards D may be removed and replaced without disturbing the others. These guards are placed above the knives and are open at the bottom, having only a nib, *d*, under the point of the knife. The heels of the guards form the upper side and part of the back side of the boxed recess, in which the cutter-bar runs.

The knife-guards are placed above the knives and are left open at the bottom, so that no grass or other obstruction can rest upon the face of the guards against which the knives work. Their bases present a continuous tool-edge from guard to guard. When the cutter-bar is at its dead-point the heel of the knife and the heel of the opposing guard are in a position ready to commence cutting, as shown in full lines in Fig. 1. When the knife has completed one-half of its stroke it will have cut through the larger portion of the grass and occupy the position shown in dotted lines, Fig. 1.

It must be borne in mind that the harvester is constantly moving forward, not only while the knives are cutting, but also while the cutter-bar is stopping, reversing and commencing another stroke. Therefore the sooner the knives begin to cut after the cutter-bar reverses its motion the less liable are they to choke from an accumulation of grass. The guards are true stationary knives, which may easily be kept ground to a tool-edge, extending from guard to guard. They are held in close contact with the reciprocating knives by the press-plate A, which is slightly beveled on the under side, so as to press upon the tops of the guards before it is brought quite home upon the top of the finger-beam C by the action of the screws *a*. Therefore I secure a shear cut more effectually than could be done by two sets of oscillating knives, because the latter involve the necessity of more play on account of the additional joint required for two knife-bars.

The finger-beam is very simple, and yet it is firm and durable. The peculiar arrangement of the boxed recess for the cutter-bar, together with placing the guards above the knives, completely prevents dirt from working therein around the cutter-bar. Even the fine grass that usually lodges on the guards (when these are placed below the knives) and obstructs their proper action is far less liable to lodge upon the knives and remain there, inasmuch as the grass, having the momentum of the knives upon which it rests, is necessarily shaken off by the sudden reversal of the stroke. On the contrary, when the guards are below, their upper surfaces collect fine grass, which, not being constantly shaken off, wedges between the knives and guards, pressing the edges apart, and thus greatly interferes with the true shear cut of the knives.

I do not claim any of the devices separately; but,

Having thus fully described my invention, what I claim, and desire to secure by Letters Patent of the United States, is—

The combination of the knife-guards D with the press-plate A, the finger-beam C, and the reciprocating cutters E, when these several parts are constructed and relatively arranged, as described, to operate conjointly in the manner and for the purpose set forth.

I. V. TRUMP.

Witnesses:
    EDM. F. BROWN,
    DANIEL BREED.